(12) United States Patent
Kubo et al.

(10) Patent No.: US 11,675,431 B2
(45) Date of Patent: Jun. 13, 2023

(54) IMAGE DISPLAY DEVICE, DISPLAY CONTROL DEVICE, AND DISPLAY CONTROL METHOD, AND PROGRAM AND RECORDING MEDIUM

(71) Applicant: Mitsubishi Electric Corporation, Tokyo (JP)

(72) Inventors: Toshiaki Kubo, Tokyo (JP); Hayato Kikuta, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/633,587

(22) PCT Filed: Sep. 30, 2019

(86) PCT No.: PCT/JP2019/038511
§ 371 (c)(1),
(2) Date: Feb. 8, 2022

(87) PCT Pub. No.: WO2021/064791
PCT Pub. Date: Apr. 8, 2021

(65) Prior Publication Data
US 2022/0308663 A1    Sep. 29, 2022

(51) Int. Cl.
*G06F 3/01* (2006.01)
*G06V 40/18* (2022.01)
(Continued)

(52) U.S. Cl.
CPC ............ *G06F 3/013* (2013.01); *G06V 20/597* (2022.01); *G06V 40/193* (2022.01);
(Continued)

(58) Field of Classification Search
CPC .......... G06F 3/013; G06F 3/3406; G06F 3/36; G06V 20/597; G06V 40/193;
(Continued)

(56) References Cited

U.S. PATENT DOCUMENTS

| 2011/0235919 A1 | 9/2011 | Morita et al. |
| 2017/0174137 A1* | 6/2017 | Kawaguchi ............... B60R 1/00 |

(Continued)

FOREIGN PATENT DOCUMENTS

| JP | 2007-276766 A | 10/2007 |
| JP | 2007-331545 A | 12/2007 |

(Continued)

OTHER PUBLICATIONS

International Search Report and Written Opinion dated Dec. 10, 2019, received for PCT Application PCT/JP2019/038511, Filed on Sep. 30, 2019, 8 pages including English Translation.

*Primary Examiner* — Stephen G Sherman
(74) *Attorney, Agent, or Firm* — Xsensus LLP

(57) ABSTRACT

A line of sight of a driver is detected based on an image of the driver obtained by image-capturing; whether the driver is viewing the image display unit or viewing an outside of the image display unit is judged based on the detected line of sight; glare is detected based on the image of the driver; and a luminance level of the image displayed by the image display unit is determined based on the glare at the time of viewing the image display unit and the glare at the time of viewing the outside of the image display unit. The visibility of the displayed image can be improved even when the driver feels glare because of external light falling upon the driver's eyes.

20 Claims, 11 Drawing Sheets

(51) Int. Cl.
  *G09G 3/34* (2006.01)
  *G06V 20/59* (2022.01)
  *G09G 3/36* (2006.01)

(52) U.S. Cl.
  CPC ............. *G09G 3/3406* (2013.01); *G09G 3/36* (2013.01); *G09G 2354/00* (2013.01); *G09G 2360/144* (2013.01); *G09G 2360/145* (2013.01); *G09G 2380/10* (2013.01)

(58) Field of Classification Search
  CPC ......... G09G 2354/00; G09G 2360/144; G09G 2360/145; G09G 2380/10
  See application file for complete search history.

(56) References Cited

U.S. PATENT DOCUMENTS

2018/0151154 A1* 5/2018 Lee .................... G09G 5/10
2019/0259279 A1   8/2019 Narumi et al.

FOREIGN PATENT DOCUMENTS

JP   2010-142345 A   7/2010
JP   2018-43724 A    3/2018

* cited by examiner

FIG. 4(a)

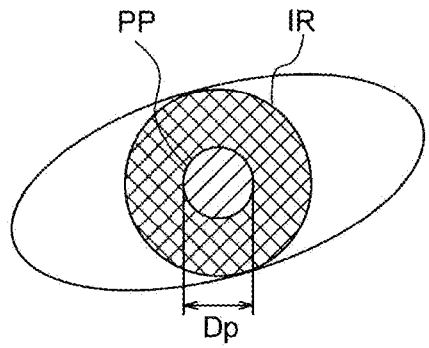

FIG. 4(b)

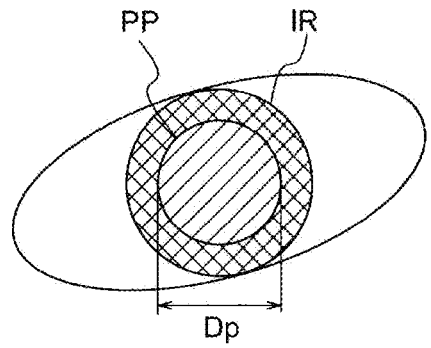

FIG. 5

| INPUT | | | LUMINANCE LEVEL ADJUSTMENT |
|---|---|---|---|
| CURRENTLY VIEWED | GLARE WHEN OUTSIDE OF IMAGE DISPLAY UNIT IS VIEWED | GLARE WHEN IMAGE DISPLAY UNIT IS VIEWED | |
| DISPLAY UNIT | HIGH | HIGH | RAISE |
| | | INTERMEDIATE | MAINTAIN |
| | | LOW | RAISE |
| | INTERMEDIATE | HIGH | LOWER |
| | | INTERMEDIATE | MAINTAIN |
| | | LOW | RAISE |
| | LOW | HIGH | LOWER |
| | | INTERMEDIATE | MAINTAIN |
| | | LOW | RAISE |
| OUTSIDE OF DISPLAY UNIT | DON'T CARE | DON'T CARE | MAINTAIN |

FIG. 6

| INPUT | | LUMINANCE LEVEL ADJUSTMENT |
|---|---|---|
| CURRENTLY VIEWED | GLARE WHEN IMAGE DISPLAY UNIT IS VIEWED | |
| DISPLAY UNIT | HIGH | LOWER |
| | INTERMEDIATE | MAINTAIN |
| | LOW | RAISE |
| OUTSIDE OF DISPLAY UNIT | DON'T CARE | MAINTAIN |

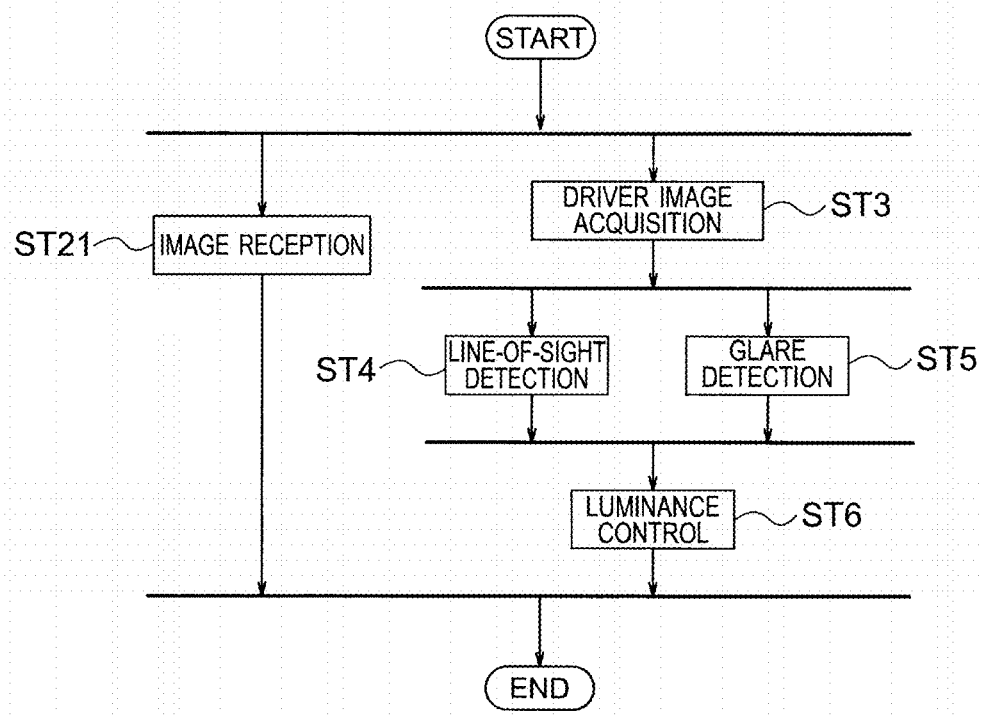
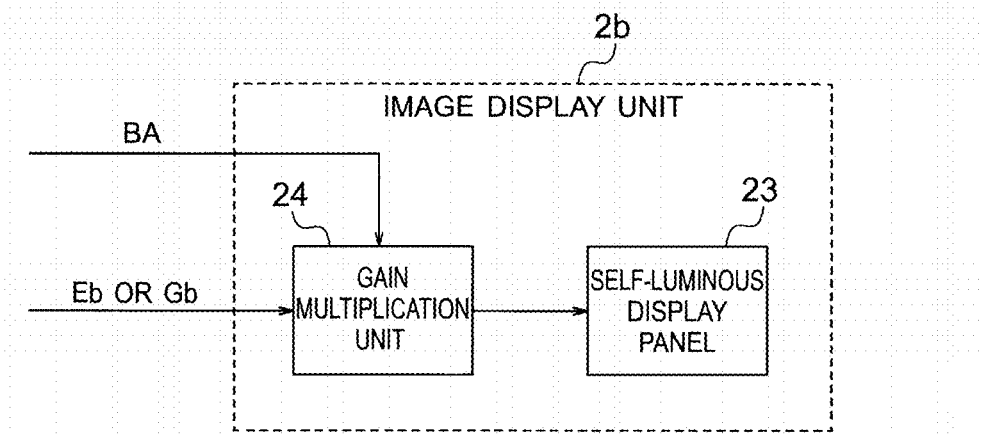

FIG. 17

| INPUT | | | LUMINANCE LEVEL ADJUSTMENT |
|---|---|---|---|
| CURRENTLY VIEWED | GLARE WHEN OUTSIDE OF IMAGE DISPLAY UNIT IS VIEWED | GLARE WHEN IMAGE DISPLAY UNIT IS VIEWED | |
| DISPLAY UNIT | HIGH | DON'T CARE | HIGHEST |
| | INTERMEDIATE | HIGH | LOWER |
| | | INTERMEDIATE | MAINTAIN |
| | | LOW | RAISE |
| | LOW | HIGH | LOWER |
| | | INTERMEDIATE | MAINTAIN |
| | | LOW | RAISE |
| OUTSIDE OF DISPLAY UNIT | DON'T CARE | DON'T CARE | MAINTAIN |

FIG. 18

| INPUT | | | LUMINANCE LEVEL ADJUSTMENT |
|---|---|---|---|
| CURRENTLY VIEWED | GLARE WHEN OUTSIDE OF IMAGE DISPLAY UNIT IS VIEWED | GLARE WHEN IMAGE DISPLAY UNIT IS VIEWED | |
| DISPLAY UNIT | HIGH | HIGH | LOWER |
| | | INTERMEDIATE | MAINTAIN |
| | | LOW | RAISE |
| | INTERMEDIATE | HIGH | LOWER |
| | | INTERMEDIATE | MAINTAIN |
| | | LOW | RAISE |
| | LOW | HIGH | LOWER |
| | | INTERMEDIATE | MAINTAIN |
| | | LOW | RAISE |
| OUTSIDE OF DISPLAY UNIT | DON'T CARE | DON'T CARE | MAINTAIN |

IMAGE DISPLAY DEVICE, DISPLAY CONTROL DEVICE, AND DISPLAY CONTROL METHOD, AND PROGRAM AND RECORDING MEDIUM

CROSS-REFERENCE TO RELATED APPLICATION

The present application is based on PCT filing PCT/JP2019/038511, filed Sep. 30, 2019, the entire contents of which are incorporated herein by reference.

TECHNICAL FIELD

The present invention relates to an image display device, a display control device, and a display control method. In particular, the present invention relates to improvement in the visibility of the image displayed on the image display unit mounted in a vehicle. The present invention also relates to a program and a recording medium.

BACKGROUND ART

In recent years, electronic mirror devices are proposed as a substitute for a physical mirror used as a rear view mirror or a side mirror. An electronic mirror device includes a display device for displaying an image obtained by image-capturing by means of a camera directed, e.g., rearward of the vehicle.

In such an image display device, an issue is how to adjust the luminance of the display.

Patent reference 1, for example, proposes a technique in which the pupil diameter of the driver is acquired from the image of the driver obtained by a driver monitoring system (DMS), and the luminance of the display is controlled based on the difference between the acquired pupil diameter and a diameter stored in advance.

PRIOR ART REFERENCES

Patent References

Patent Reference 1: Japanese Patent Publication No. 2018-43724.

SUMMARY OF THE INVENTION

Problems to be Solved by the Invention

There are instances in which the technique disclosed in Patent reference 1 cannot control the display luminance properly. For example, when the driver is viewing a display screen in a vehicle when the illuminance outside of the vehicle is high, as in the daytime, the driver may feel glare because of external light falling upon the driver's eyes. Similarly, during driving at night, when the light from the oncoming vehicle, or the like falls upon the driver's eyes, the driver may feel glare. In such a case, if the display luminance is lowered, according to the teaching of Patent Reference 1, the visibility of the displayed image is worsened.

So far, description has been made on cases in which an image of an environment surrounding the vehicle is displayed by the image display device. Similar problems arise when an image other than the image of the environment of the vehicle, for example, an image supplied from a car-navigation system is displayed.

An object of the present invention is to enable improvement in the visibility of the displayed image even when the driver feels glare because of external light falling upon the driver's eyes.

Means for Solving the Problem

An image display device according to the present invention includes:
  an image display unit mounted in a vehicle to display an image;
  a driver imaging unit to capture an image of a driver of said vehicle; and
  a display control device to acquire an image of said driver from the image obtained by image-capturing by said driver imaging unit, to detect a line of sight of said driver based on the image of said driver, to judge whether said driver is viewing said image display unit or an outside of said image display unit based on the detected line of sight and information indicating a position of said image display unit, to detect glare being felt by said driver based on the image of said driver, and to determine a luminance level of the image displayed by said image display unit based on the glare at the time of viewing said image display unit and the glare at the time of viewing the outside of said image display unit; wherein
  said image display unit displays the image with the luminance level determined by said display control device.

A display control device according to the present invention is to adjust luminance of an image displayed by an image display unit mounted in a vehicle to display the image, and comprises:
  a line-of-sight detection unit to detect a line of sight of a driver based on an image of said driver obtained by image-capturing, and to judge whether said driver is viewing said image display unit or an outside of said image display unit based on the detected line of sight and information indicating a position of said image display unit;
  a glare detection unit to detect glare being felt by said driver based on the image of said driver; and
  a luminance control unit to determine a luminance level of the image displayed by said image display unit based on the glare at the time of viewing said image display and the glare at the time of viewing the outside of said image display unit, wherein
  said image display unit is caused to display the image with the luminance level determined by said luminance control unit.

Effect of the Invention

According to the present invention, it is possible to improve the visibility of the displayed image even when the driver feels glare because of external light falling upon the driver's eyes.

BRIEF DESCRIPTION OF THE DRAWINGS

FIGS. 4(a) and 4(b) are diagrams showing a variation in a pupil diameter.

FIG. 5 is a table showing an example of a set of rules for luminance level adjustment in Embodiment 1.

FIG. 6 is a table showing a set of rules for luminance level adjustment in a comparative example.

FIG. 15 is a flowchart showing a procedure of processes followed by a processor, when the display control device shown in FIG. 14 is formed of a computer.

FIG. 16 is a block diagram showing a configuration of an image display unit used in Embodiment 4 of the present invention.

FIG. 17 is a table showing an example of a set of rules for luminance level adjustment applied to Embodiment 5 of the present invention.

FIG. 18 is a table showing an example of a set of rules for luminance level adjustment applied to Embodiment 6 of the present invention.

MODE FOR CARRYING OUT THE INVENTION

Embodiment 1

Figure 1:
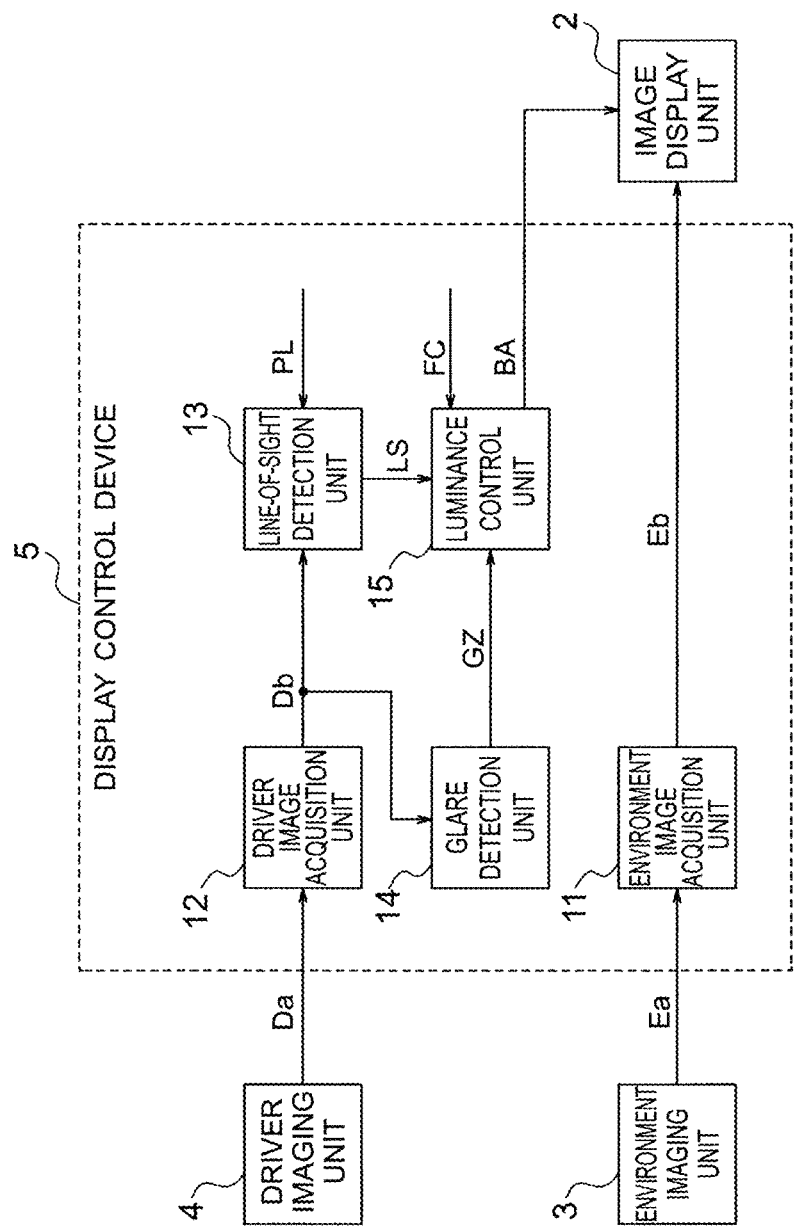
FIG. 1 is a block diagram showing a configuration of an image display device according to Embodiment 1 of the present invention.

FIG. 1 is a diagram showing a configuration of an image display device according to Embodiment 1 of the present invention.

The illustrated image display device includes an image display unit 2, an environment imaging unit 3, a driver imaging unit 4, and a display control device 5.

The image display unit 2 is mounted in a vehicle, and is placed at a position suitable for a driver to view the display screen. The driver is a person seated in a driver's seat.

In the following description, the vehicle in which the image display unit 2 is mounted may be called an own vehicle.

Figure 2:
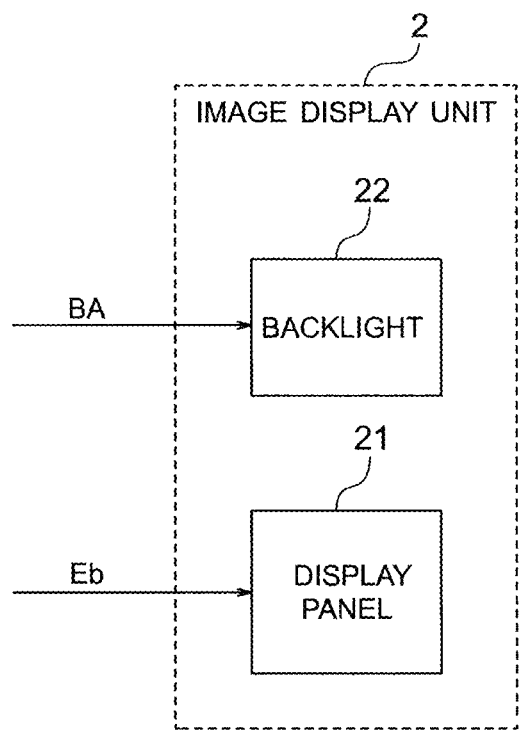
FIG. 2 is a block diagram showing an example of a configuration of an image display unit in FIG. 1.

For example, the image display unit 2 includes a display panel 21 and a backlight 22, as shown in FIG. 2. The display panel 21 is, for example, formed of a transmissive display panel, for example, a transmissive LCD (Liquid Crystal Display) panel. The backlight 22 is provided on the rear side of the display panel 21.

For example, the environment imaging unit 3 includes one or more cameras, captures image(s) of the environment of the own vehicle, and outputs the image(s) Ea obtained by the image-capturing.

For example, the driver imaging unit 4 includes one or more cameras, captures image(s) of the driver, and outputs the image(s) Da obtained by the image-capturing.

The display control device 5 receives the image(s) Ea outputted from the environment imaging unit 3, and causes the image display unit 2 to display the received image(s), or an image obtained by processing the received image(s).

The display control device 5 detects glare being felt by the driver, based on the image(s) Da outputted from the driver imaging unit 4, judges whether the driver is viewing the image display unit 2, or an outside of the image display unit 2, determines a luminance level based on the result of the detection and the result of the judgment, and controls the luminance level of the image displayed by the image display unit 2.

The display control device 5 is provided with an environment image acquisition unit 11, a driver image acquisition unit 12, a line-of-sight detection unit 13, a glare detection unit 14, and a luminance control unit 15.

The environment image acquisition unit 11 receives the image (s) Ea outputted from the environment imaging unit 3, and acquires and outputs an image (environment image) Eb representing the state of the environment of the own vehicle.

When the environment imaging unit 3 is formed of a single camera, the environment image acquisition unit 11 may output the image obtained by image-capturing by the camera, as the environment image Eb, without change, or it may extract part of the image obtained by image-capturing by the camera, and output the extracted part of the image as the environment image Eb.

When the environment imaging unit 3 is formed of two or more cameras, the environment image acquisition unit 11 may select one of the images obtained by image-capturing by the cameras, and output the selected image as the environment image Eb, without change, or it may extract part of the selected image, and output the selected part of the image as the environment image Eb. Alternatively, the images obtained by image-capturing by the two or more cameras may be used to form a combined image, and the combined image may be outputted as the environment image Eb.

The environment image acquisition unit 11 may output the image of a fixed direction of the own vehicle, as the environment image Eb. Alternatively, the image of the direction which is selected according to the driving state of the own vehicle may be outputted as the environment image Eb. For example, depending on whether the vehicle is turning to the right, turning to the left, changing the lane, moving backward, or the like, the image of the direction having a higher degree of need in the driving in the particular situation may be outputted as the environment image Eb.

The image display unit 2 displays the environment image Eb outputted from the environment image acquisition unit 11, on the display panel 21.

The driver image acquisition unit 12 receives the image(s) Da outputted from the driver imaging unit 4, and acquires and outputs image (s) (driver image (s)) Db of the driver. The driver image(s) Db are image(s) including the face of the driver.

When the driver imaging unit 4 is formed of a single camera, the driver image acquisition unit 12 may output the image obtained by image-capturing by the camera, as the driver image Db, without change, or it may extract part of the image obtained by image-capturing by the camera, and output the extracted part of the image as the driver image Db.

For example, the image obtained by image-capturing by the camera may include not only the driver, but also the surroundings of the driver, and part of such an image may be extracted and outputted as the driver image Db.

When the driver imaging unit 4 is formed of two or more cameras, the driver image acquisition unit 12 may select one of the images obtained by image-capturing by the two or more cameras, and output the selected image as the driver image Db, without change, or it may extract part of the selected image and output the extracted part of the image as the driver image db. Alternatively, two or more images obtained by image-capturing of the driver from different angles using the two or more cameras may be outputted respectively as the driver images Db, or an image obtained by combining the two or more such images may be outputted as the driver image Db.

The line-of-sight detection unit 13 detects the line of sight from the driver image(s) Db outputted from the driver image acquisition unit 12. The detection of the line of sight includes detection of the position of the viewpoint and the detection of the direction of the line of sight.

The line-of-sight detection unit 13 may calculate the line of sight from the orientation of the face of the driver and the positions of the pupils of the left and right eyes of the driver.

The line-of-sight detection unit 13 also judges whether the driver is viewing the image display unit 2, or the outside of the image display unit 2, based on the result of the detect ion of the line of sight and information PL indicating the position of the image display unit 2 stored in advance in an Internal memory, not shown, and outputs information (line-of-sight judgment information) LS indicating the result of the judgment.

In the judgment as to whether the driver is viewing the image display unit 2, or the outside of the image display unit 2, it may be found that the driver is viewing the image display device 2 only if the driver is looking at a particular part, e.g., the central part of the display screen, or it may be found that the driver is viewing the image display device 2 even if the driver is looking at any point within a region a little broader than the image display unit 2.

In the judgment that the driver is viewing the outside of the image display unit 2, it may be found that the driver is viewing the outside of the image display unit 2 only if the driver is looking a specific direction outside of the image display unit 2, e.g., the forward direction. Alternatively, it may be found that the driver is viewing the outside of the image display unit, if the driver is not found to be viewing the image display unit 2. In the latter case, the state in which the driver is viewing the outside of the image display unit 2 includes a state in which the focus of attention is not fixed and the driver is not watching anything in particular.

The glare detection unit 14 detects the level of glare the driver is feeling, based on the driver image(s) Db outputted from the driver image acquisition unit 12, and outputs information (glare information) GZ indicating the detected glare level.

Figure 3:
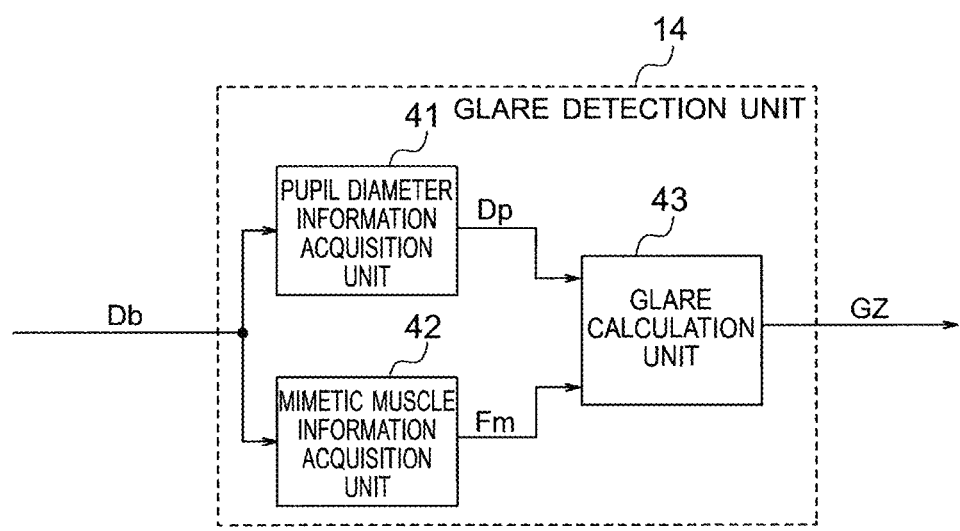
FIG. 3 is a block diagram showing an example of a configuration of a glare detection unit in FIG. 1.

For example, the glare detection unit 14 includes a pupil diameter information acquisition unit 41, a mimetic muscle information acquisition unit 42, and a glare calculation unit 43, as shown in FIG. 3.

The pupil diameter information acquisition unit 41 measures the pupil diameter Dp, and acquires and outputs information (pupil diameter information) indicating the measured pupil diameter Dp.

The mimetic muscle information acquisition unit 42 detects a feature quantity Fm of the mimetic muscles from the image(s) of the face of the driver, and acquires and outputs information (mimetic muscle information) indicating the detected feature quantity Fm.

The glare calculation unit 43 calculates the glare for the driver, based on the pupil diameter Dp represented by the pupil diameter information outputted from the pupil diameter information acquisition unit 41, and the feature quantity Fm represented by the mimetic muscle information outputted from the mimetic muscle information acquisition unit 42.

FIGS. 4(*a*) and 4(*b*) show a pupil PP of a human eye, and an iris IR around the pupil IR. Generally, in order to adjust the amount of light reaching the retina, the size of the pupil PP is changed by expansion and contraction of the iris IR. The pupil diameter Dp is reduced as shown in FIG. 4 (*a*) in a glaring condition, and is enlarged as shown in FIG. 4(*b*), in a dark condition.

The pupil diameter information acquisition unit 41 measures the pupil diameter Dp based on the eye region in the image (s) of the face of the driver, and outputs the measurement result to the glare calculation unit 43.

When the eyes are narrowed responsive to glare, the state of the mimetic muscles of the face, in the neighborhood of the eyes, is also changed. The mimetic muscle information acquisition unit 42 detects the feature quantity F of the mimetic muscles based on the image (s) of the face of the driver, and outputs the detection result to the glare calculation unit 43. The feature quantity of the mimetic muscles referred herein means a quantity which becomes larger due to a change in the state of the mimetic muscles at the time when the eyes are narrowed because of glare. It may be a quantity representing the state of the mimetic muscles at each time point, or a quantity calculated based on the change with lapse of time, e.g., a quantity obtained by accumulating the quantity of the above-mentioned change.

The glare calculation unit 43 calculates the glare level based on the pupil diameter Dp and the feature quantity Fm of the mimetic muscles, and outputs the information (glare information) GZ indicating the calculated glare level.

For example, the smaller the pupil diameter Dp is, the larger the degree of the glare is evaluated, and the larger the pupil diameter Dp is, the smaller the degree of the glare is evaluated. Also, the larger the feature quantity Fm of the mimetic muscles is, the larger the degree of the glaze is evaluated. The glare calculation unit 43 synthesizes the results of evaluation and evaluates the glare.

For example, according to the degree of the glare, the glare level is evaluated to be "high", "intermediate" or "low".

In the above example, the glare level is one of three levels, i.e., "high", "intermediate" and "low". The number of the glare levels may be two, or more than three. For example, it may be ten or thereabouts.

The luminance control unit 15 determines the luminance level of the image displayed on the image display unit 2, based on the line-of-sight judgment information LS outputted from the line-of-sight detection unit 13, and the glare information GZ outputted from the glare detection unit 14.

The luminance level of the displayed image is determined also taking account of factors (hereinafter referred to as "other factors" and denoted by a reference sign FC) other than the line-of-sight judgment information LS and the glare information GZ. For example, it is determined based also on a signal representing the brightness set by the user, and a signal based on the brightness of the image inputted to the image display unit 2.

The determination of the luminance level based on the line-of-sight judgment information LS and the glare information takes the form of adjustment to or alteration from the luminance level determined based on such other factors FC.

The determination of the luminance level is realized, for example, by determining light emission brightness of the backlight 22.

The luminance of each pixel of the displayed image is determined by the light emission brightness of the backlight 22, and the value (pixel value) of the signal used for driving each pixel of the display panel 21.

The adjustment of the luminance level of the displayed image is performed in the following manner.

The luminance control unit 15 determines whether the driver is viewing the image display unit 2 or viewing the outside of the image display unit 2 at each time point, based on the line-of-sight judgment information LS.

The luminance control unit 15 stores, in an internal memory not illustrated, the glare level at the time of viewing the image display unit 2, and the glare level at the time of viewing the outside of the image display unit 2.

The stored glare level is updated when data representing the glare level is newly acquired. The acquisition of the data is performed every processing period.

For example, the glare level detected at the time when the driver is found to be viewing the image display unit 2 is stored as the "glare level at the time of viewing the image display unit 2".

Similarly, the glare level detected at the time when the driver is found to be viewing the outside of the image display unit 2 is stored as the "glare level at the time of viewing the outside of the image display unit 2".

Based on the result of judgment as to whether the driver is currently viewing the image display unit 2 or the outside of the image display unit 2, the glare level at the time of viewing the image display unit 2, and the glare level at the time of viewing the outside of the image display unit 2, the luminance control unit 15 determines whether it is necessary to adjust the luminance level, and determines how the adjustment, if found necessary, is to be made.

If the driver is currently viewing the image display unit 2, "the glare level at the time of viewing the image display unit 2" means the level of the glare currently being detected by the glare detection unit 14, and "the glare level at the time of viewing the outside of the image display unit 2" means "the level of the glare at the time when the outside of the image display unit 2 was viewed" prior to the present time point, stored in the luminance control unit 15.

If the driver is currently viewing the outside of the image display unit 2, "the glare level at the time of viewing the outside of the image display unit 2" means the level of the glare currently being detected by the glare detection unit 14, and the "glare level at the time of viewing the image display unit 2" means "the level of the glare at the time when the image display unit was viewed" prior to the present time point, stored in the luminance control unit 15.

Determining how the adjustment is to be made includes determining the degree of the adjustment.

The degree of the adjustment means a width of adjustment or a coefficient used for the adjustment.

When a width of the adjustment is used, the width of the adjustment is added to or subtracted from the luminance level determined based on the other factors FC. To raise the luminance level, the width of the adjustment is added. To lower the luminance level, the width of the adjustment is subtracted. The width of the adjustment for raising the luminance level and the width of the adjustment for lowering the luminance level may be different from each other.

When a coefficient of the adjustment is used, the luminance level determined based on the other factors FC is multiplied by the coefficient of the adjustment. To raise the luminance level, a coefficient larger than 1 is used. To lower the luminance level, a coefficient smaller than 1 is used.

In the present embodiment, the degree of the adjustment is fixed and predetermined, and in the determination concerning the adjustment of the luminance level, determination is made as to whether the luminance level is to be raised, to be lowered, or to be maintained.

For example, the determination concerning the adjustment of the luminance level is made according to a set of rules shown in FIG. 5. The rules included in the set of rules shown in FIG. 5 are as follows:

(a) If the driver is currently viewing the image display unit 2, the following processes are performed.

(a11) If the glare level at the time of viewing the outside of the image display unit 2 is "high", and the glare level at the time of viewing the image display unit 2 is "high", then the luminance level of the displayed image is raised.

(a12) If the glare level at the time of viewing the outside of the image display unit 2 is "high", and the glare level at the time of viewing the image display unit 2 is "intermediate", then the luminance level of the displayed image is maintained.

(a13) If the glare level at the time of viewing the outside of the image display unit 2 is "high", and the glare level at the time of viewing the image display unit 2 is "low", then the luminance level of the displayed image is raised.

(a21) If the glare level at the time of viewing the outside of the image display unit 2 is "intermediate", and the glare level at the time of viewing the image display unit 2 is "high", then the luminance level of the displayed image is lowered.

(a22) If the glare level at the time of viewing the outside of the image display unit 2 is "intermediate", and the glare level at the time of viewing the image display unit 2 is "intermediate", then the luminance level of the displayed image is maintained.

(a23) If the glare level at the time of viewing the outside of the image display unit 2 is "intermediate", and the glare level at the time of viewing the image display unit 2 is "low", then the luminance level of the displayed image is raised.

(a31) If the glare level at the time of viewing the outside of the image display unit 2 is "low", and the glare level at the time of viewing the image display unit 2 is "high", then the luminance level of the displayed image is lowered.

(a32) If the glare level at the time of viewing the outside of the image display unit 2 is "low", and the glare level at the time of viewing the image display unit 2 is "intermediate", then the luminance level of the displayed image is maintained.

(a33) If the glare level at the time of viewing the outside of the image display unit 2 is "low", and the glare level at the time of viewing the image display unit 2 is "low", then the luminance level of the displayed image is raised.

(b) If the driver is currently viewing the outside of the image display unit 2, the luminance level of the displayed image is maintained, without regard to the glare level at the time of viewing the image display unit 2 and the glare level at the time of viewing the outside of the image display unit 2.

The luminance control unit 15 performs the adjustment of the luminance level according to the above-mentioned set of rules, and outputs a luminance control signal BA indicating the adjusted luminance level.

Based on the luminance control signal BA from the luminance control unit 15, the image display unit 2 controls the luminance of the backlight 22.

The luminance level indicated by the luminance control signal BA has been adjusted based on both of the glare due to the image display unit 2 and the glare due to the external light, so that the image displayed by the image display unit 2 has a high visibility regardless of the glare due to the image display unit 2 and the glare due to the external light.

Here, the operation of a configuration (comparative example) which does not take account of the glare level of the light external to the image display unit 2 is explained. FIG. 6 shows a set of rules for the luminance level adjustment in the comparative example. In the example shown in FIG. 6, when the driver is currently viewing the image display unit 2, the luminance level is lowered if the glare level is "high", the luminance level is maintained if the glare level is "intermediate", and the luminance level is raised if the glare level is "low".

For example, even when the driver is viewing the image display unit 2, the driver may be severely affected by the external light. For example, in the day time on a summer bright day, the illuminance is very high, and much external light falls upon the driver's eyes even when the driver is viewing the image display unit 2. Also, there are instances when much light falls upon the driver's eyes, even when the driver is viewing the image display unit 2, due for example to reflection from the vehicle in front, and high beams from the oncoming vehicle at night, or the sun setting in the evening. In such a condition, the visibility of the image display unit. 2 is lowered due to the effect of the external light. In such a case, in the comparative example, the luminance level is lowered because the glare level at the time of viewing the image display unit 2 is "high", with the result that the visibility is even lowered.

In contrast, in the adjustment performed according to the set of rules shown in FIG. 5, the luminance level of the displayed image is raised if the glare level due to the external light is high. As a result, the visibility of the displayed image can be improved.

Figure 7:
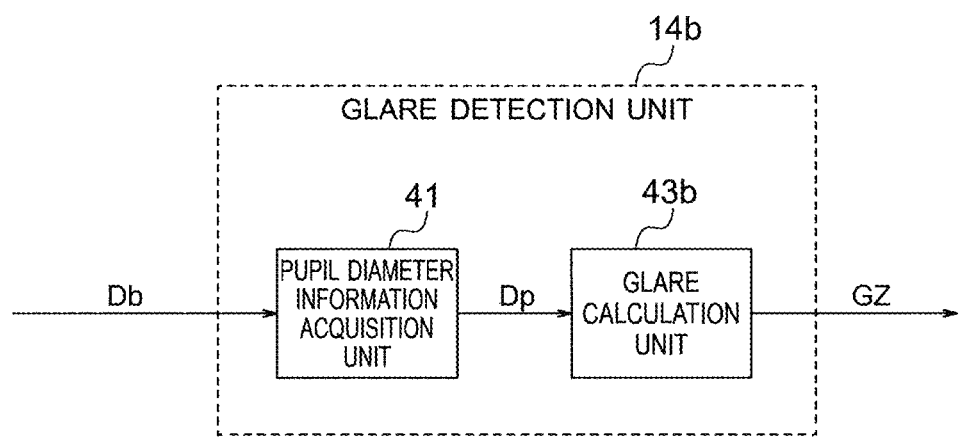
FIG. 7 is a block diagram showing another example of a configuration of the glare detection unit.
Figure 8:
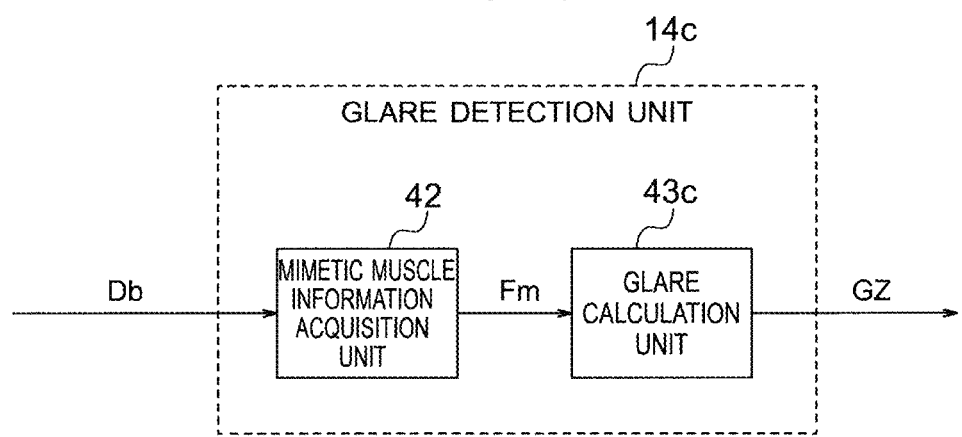
FIG. 8 is a block diagram showing a further example of a configuration of the glare detection unit.

Incidentally, the glare detection unit 14 in FIG. 3 is provided with the pupil diameter information acquisition unit 41 and the mimetic muscle information acquisition unit 42. However, a glare detection unit which is provided with just one of them may be used. That is, a glare detection unit 14b provided with the pupil diameter information acquisition unit 41 and a glare calculation unit 43b, as shown in FIG. 7, may be used, or a glare detection unit 14c provided with the mimetic muscle information acquisition unit 42 and a glare calculation unit 43c as shown in FIG. 8 may be used. The glare calculation unit 43b in FIG. 7 performs the glare evaluation based on the pupil diameter Dp outputted from the pupil diameter information acquisition unit 41. The glare calculation unit 43c in FIG. 8 performs the glare evaluation based on the feature quantity Fm outputted from the mimetic muscle information acquisition unit 42.

In summary, it is sufficient if the glare detection unit detects the glare based on at least one of the result of the measurement of the pupil diameter and the result of the detection of the feature quantity of the mimetic muscles.

Part or the entirety of the display control device shown in FIG. 1 can be formed of processing circuitry. For example, the functions of each part of the display control device 5 may be implemented by a separate processing circuit, alternatively, the functions of a plurality of parts may be implemented all by a single processing circuit.

The processing circuitry may be formed of hardware, or software, i.e., a programmed computer.

Part of the functions of each part of the display control device 5 may be implemented by hardware and the remainder may be implemented by software.

Figure 9:
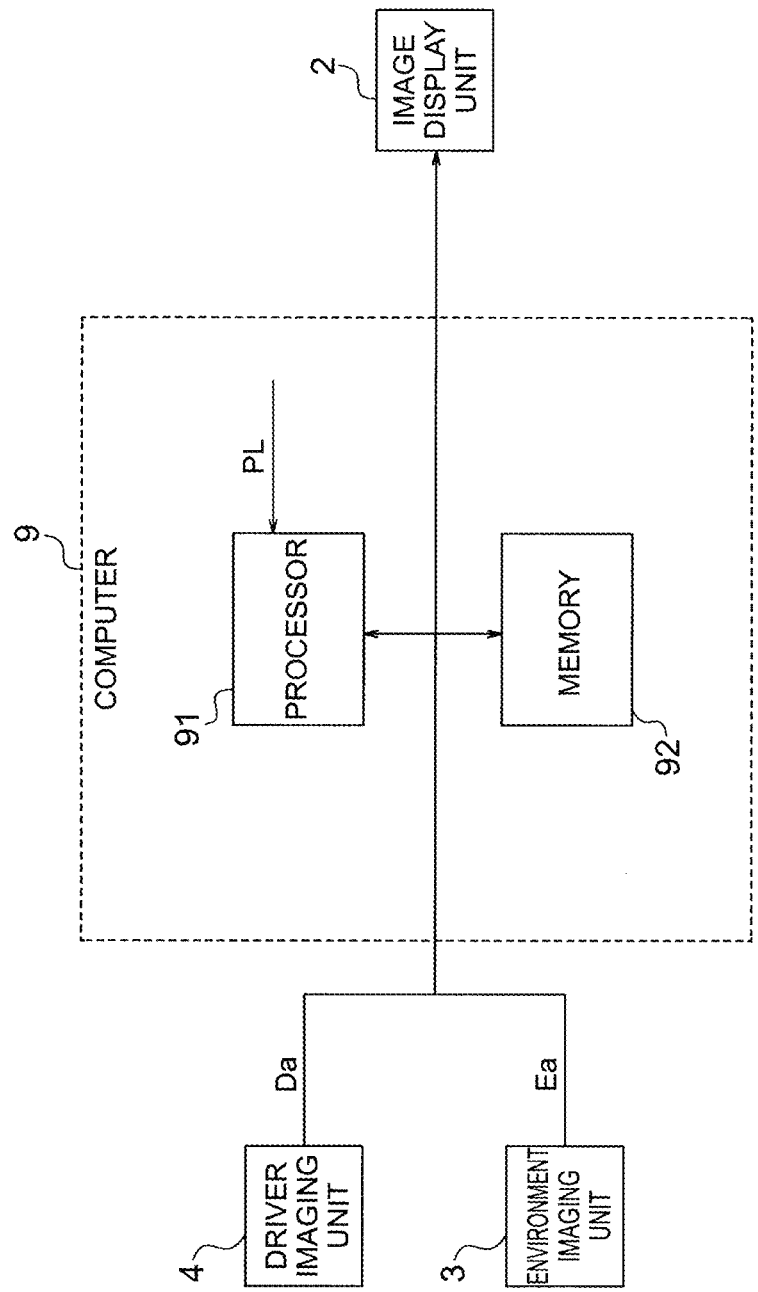
FIG. 9 is a block diagram showing a computer for implementing the display control device of Embodiment 1, together with an image display unit, an environment imaging unit, and a driver imaging unit.

FIG. 9 shows a computer 9 which implements all the functions of the display control device 5, together with the image display unit 2, the environment imaging unit 3, and the driver imaging unit 4.

In the illustrated example, the computer 9 includes a processor 91 and a memory 92.

The memory 92 stores programs for implementing the functions of respective parts of the display control device 5.

The processor 91 may be formed of a CPU (Central Processing Unit), a GPU (Graphics Processing Unit), a microprocessor, a microcontroller, a DSP (Digital Signal Processor), or the like.

The memory 92 may be formed of a semiconductor memory, such as a RAM (Random Access Memory), a ROM (Read Only Memory), a flash memory, an EPROM (Erasable Programmable Read Only Memory), or an EEPROM (Electrically Erasable Programmable Read Only Memory), a magnetic disc, an optical disc, a magneto-optical disc, or the like.

The processor 91 implements the functions of the display control device 5 by executing the programs stored in the memory 92.

The functions of the display control device 5 include control over the display on the image display unit 2 (supply of the signals to the display panel 21, and control over the light emission brightness of the backlight 22).

The computer shown in FIG. 9 comprises a single processor. It may however include two or more processors.

Figure 10:
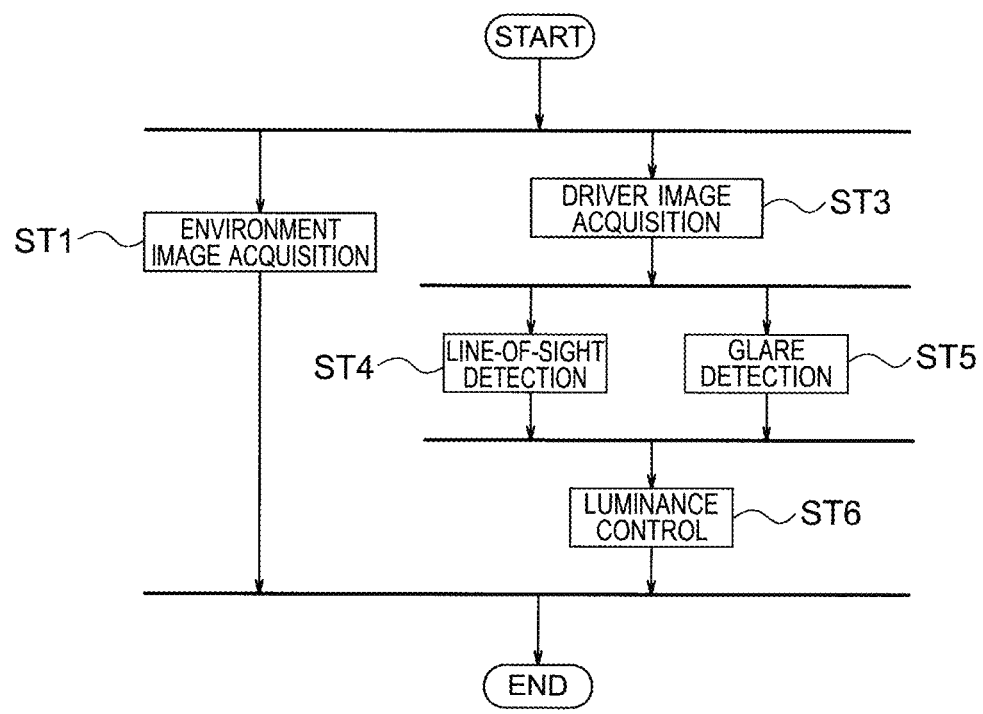
FIG. 10 is a flowchart showing a procedure of processes followed by a processor, when the display control device shown in FIG. 1 is formed of a computer.

A procedure of the processes followed by the processor 91 in a case in which the above-described display control device 5 is formed of the computer shown in FIG. 9 will, now be explained with reference to FIG. 10. The processes shown in FIG. 10 are performed every processing period.

In step ST1, acquisition and output of the environment image Eb is performed. This process is similar to the process performed by the environment image acquisition unit 11 in FIG. 1.

The outputted environment image Eb is supplied to the image display unit 2 and displayed by the image display unit 2.

In step ST3, acquisition and output of the driver image (s) is performed. This process is similar to the process performed by the driver image acquisition unit 12 in FIG. 1.

In step ST4, detection of the line of sight is performed. This process is similar to the process performed by the line-of-sight detection unit 13 shown in FIG. 1.

In step ST5, detection of the glare is performed. This process is similar to the process performed by the glare detection unit 14 shown in FIG. 1, the glare detection unit 14b shown in FIG. 7, or the glare detection unit 14c shown in FIG. 8.

In step ST6, control over the luminance is performed. This process is similar to the process performed by the luminance control unit 15 shown in FIG. 1.

The step ST1 and the steps ST3 to ST6 may be performed at different processing periods.

According to Embodiment 1, even when the driver feels glare because of the external light falling upon the driver's eyes, the luminance level of the displayed image can be controlled properly, and therefore the visibility of the displayed image can be improved.

Embodiment 2

Figure 11:
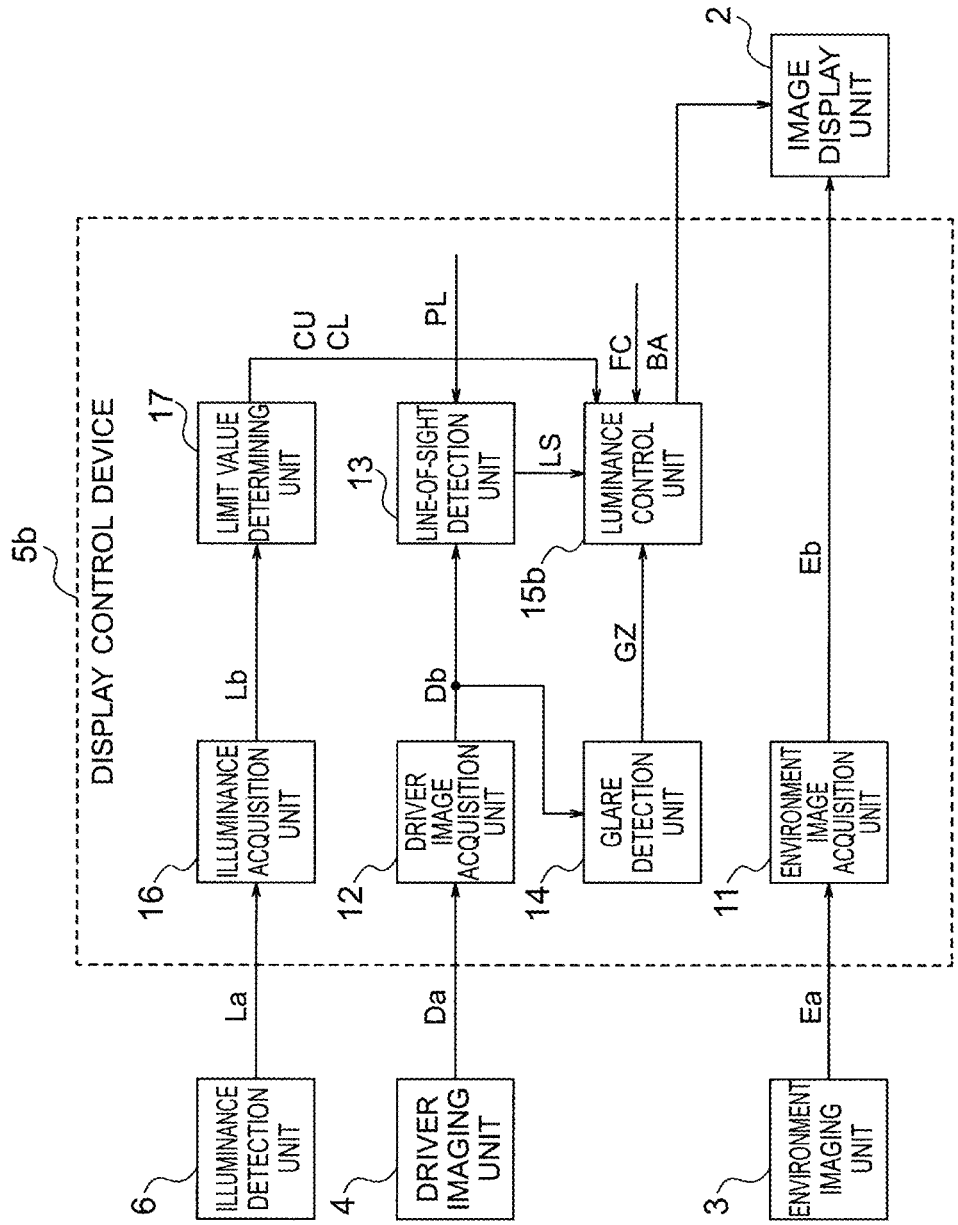
FIG. 11 is a block diagram showing a configuration of an image display device according to Embodiment 2 of the present invention.

FIG. 11 is a diagram showing a configuration of an image display device according to Embodiment 2 of the present invention.

The image display device according to Embodiment 2 is generally identical to the image display device of Embodiment 1 shown in FIG. 1. However, an illuminance detection unit 6 is added, and in place of the display control device 5, a display control device 5b is provided.

The display control device Sb is generally identical to the display control device 5 in FIG. 1, but an illuminance acquisition unit 16 and a limit value determining unit 17 are added, and in place of the luminance control unit 15 in FIG. 1, a luminance control unit 15b is provided.

The illuminance detection unit 6 detects an illuminance in the surroundings of the image display unit 2 in the own vehicle or the surroundings of the driver, and outputs a detection signal La. For example, the illuminance detection unit 6 may be provided in the same housing as the image display unit 2. In the following description, the illuminance detection unit 6 is assumed to detect the illuminance in the surroundings of the driver.

Receiving the detection signal La from the illuminance detection unit 6, the illuminance acquisition unit 16 acquires data (illuminance data) Lb indicating the illuminance, and outputs the data Lb.

The limit value determining unit 17 determines an upper limit value CU and a lower limit value CL based on the illuminance data Lb outputted from the illuminance acquisition unit 16.

Figure 12:
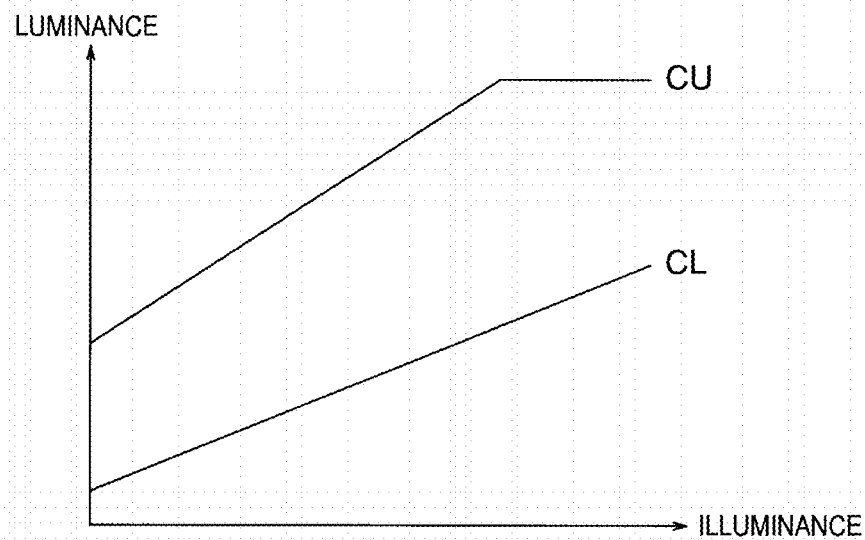
FIG. 12 is a diagram showing examples of an upper limit value and a lower limit value determined by a limit value determining unit shown in FIG. 11.

FIG. 12 shows examples of the upper limit value CU and the lower limit value CL determined by the limit value determining unit 17. The limit value determining unit 17 has an internal memory which is not illustrated and stores a table (limit value table) indicating a relationship between the illuminance, and the upper limit value and the lower limit value, determines the upper limit value CU and the lower limit value CL from the inputted illuminance, and outputs the upper limit value CU and the lower limit value CL to the luminance control unit 15b.

The limit value table may have the upper limit value CU and the lower limit value CL, for each of the values which the detected illuminance can assume, but this is not a restriction. For example, the upper limit values and lower limit values may be stored discretely against the values of the illuminance, and for the illuminance for which the upper limit value and the lower limit value are not stored, the upper limit value and the lower limit value may be determined by interpolation. This interpolation may, for example, be performed using the upper limit value and the lower limit value corresponding to values (table points) of the illuminance for which the upper limit value and the lower limit value are stored.

The luminance control unit 15b determines the luminance level of the image displayed by the image display unit 2, based on the line-of-sight judgment information LS outputted from the line-of-sight detection unit 13, the glare information GZ outputted from the glare detection unit 14, and the above-mentioned other factors FC, as well as the upper limit value CU and the lower limit value CL from the limit value determining unit 17. Specifically, the light emission brightness of the backlight is determined.

The determination of the luminance level based on the line-of-sight judgment information LS, the glare information GZ, and the other factors FC is performed in the same way as was described in Embodiment 1.

The luminance control unit 15b modifies the luminance level to be not larger than the upper limit value CU when the luminance level, i.e., the light emission brightness, of the backlight 22 determined based on the line-of-sight judgment information LS, the glare information GZ, and the other factors FC is larger than the upper limit value CU, and modifies the luminance level to be not smaller than the lower limit value CL when the luminance level determined based on the line-of-sight judgment information LS, the glare information GZ, and the other factors FC is smaller than the lower limit value CL.

This process is performed, for example, by clipping. That is, the value of the luminance level larger than the upper limit value CU is changed to be equal to the upper limit value CU, and the value of the luminance level smaller than the lower limit value CL is changed to be equal to the lower limit value CL.

Like the display control device 5 in FIG. 1, part or the entirety of the display control device 5b in FIG. 11 can be formed of processing circuitry. The processing circuitry may be formed of a computer, similar to that in FIG. 9.

A procedure of processes followed by the processor 91 in a case in which the above-described display control device 5b is formed of a computer similar to that described above will now be explained with reference to FIG. 13.

Figure 13:
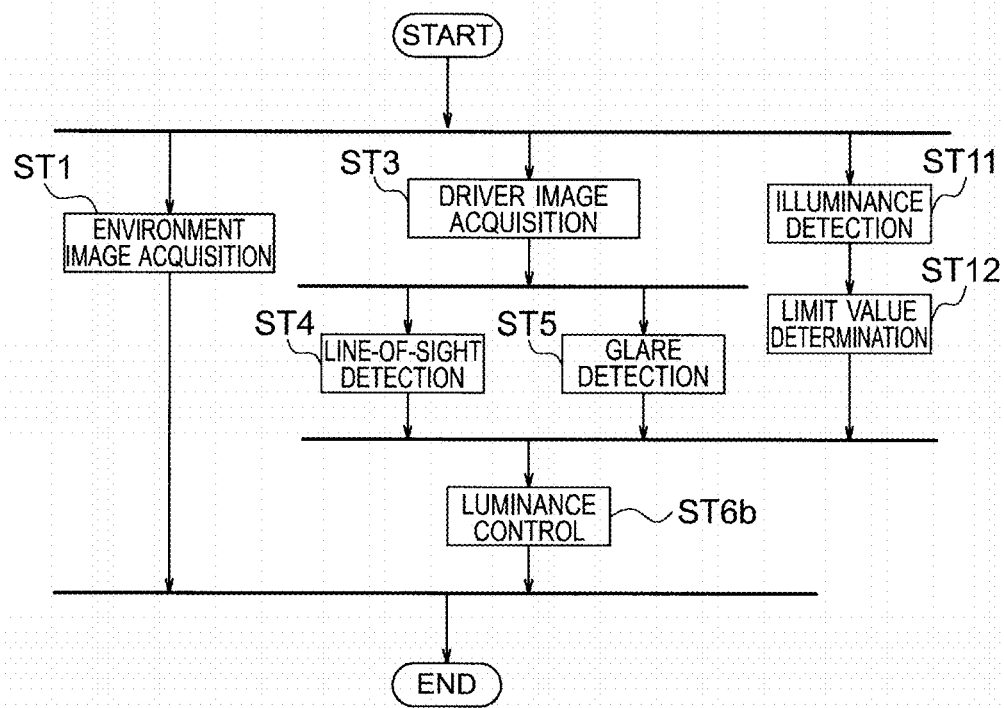
FIG. 13 is a flowchart showing a procedure of processes followed by a processor, when the display control device shown in FIG. 11 is formed of a computer.

The procedure of processes shown in FIG. 13 is generally identical to that shown in FIG. 10. However, steps ST11 and ST12 are added, and step ST6 is replaced by step ST6b.

In step ST1l, acquisition and output of the data indicating the illuminance is performed. This process is similar to the process performed by the illuminance acquisition unit 16 in FIG. 11.

In step ST12, determination of the upper limit value CU and the lower limit value CL is performed. This process is similar to the process performed by the limit value determining unit 17 in FIG. 11.

In step ST6b, control over the luminance is performed. This process is similar to the process performed by the luminance control unit 15b in FIG. 11.

Even according to Embodiment 2, effects similar to those of Embodiment 1 can be obtained.

Also, the luminance control unit 15b determines the upper limit value CU and the lower limit value CL suitable for the illuminance, and performs such a control that the luminance level of the displayed image does not become larger than the upper limit value CU, and does not become smaller than the lower limit value CL, so that it is possible to prevent the luminance of the displayed image from becoming too high or too low.

Incidentally, in the above example, both of the upper limit value CU and the lower limit value CL are used. However, just one of the upper limit value CU and the lower limit value CL may be used. That is, the limit value determining unit 17 may determine only one of the upper limit value CU and the lower limit value CL, and the luminance control unit 15b may perform such a control that the luminance level of the displayed image does not become larger than the upper limit value CU, or does not become smaller than the lower limit value CL.

Embodiment 3

Figure 14:
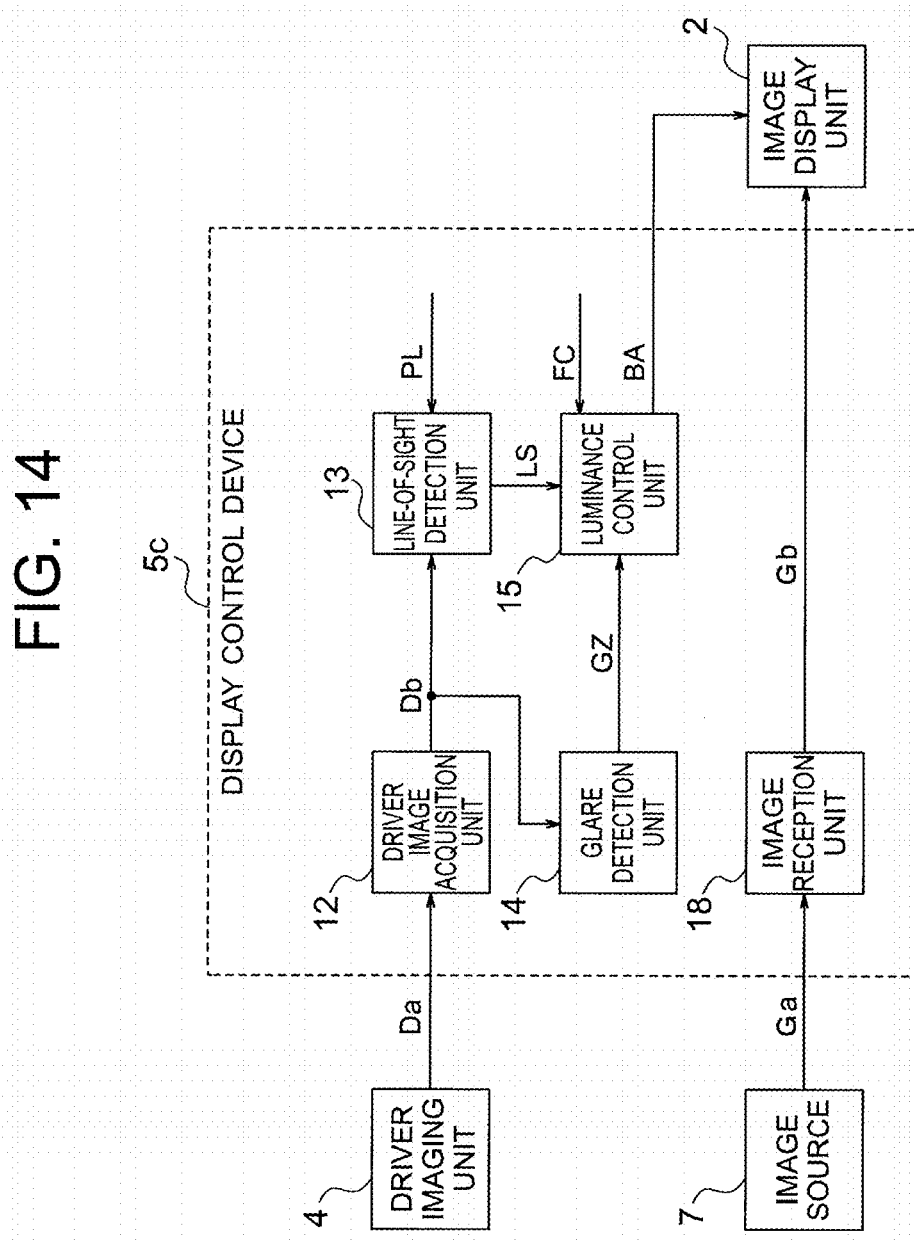
FIG. 14 is a block diagram showing a configuration of an image display device according to Embodiment 3 of the present invention.

FIG. 14 is a diagram showing a configuration of an image display device according to Embodiment 3 of the present invention.

The image display device according to Embodiment 3 is generally identical to the image display device of Embodiment 1 shown in FIG. 1. However, the environment imaging unit 3 shown in FIG. 1 is not provided, but instead, an image source 7 is provided, and in place of the display control device 5, a display control device 5c is provided.

The display control device 5c is generally identical to the display control device 5 in FIG. 1, but the environment image acquisition unit 11 is not provided, instead, an image reception unit 18 is provided.

The image source 7 supplies an image Ga other than the environment image. For example, the image other than the environment image is an image from a car-navigation system, an image representing an instrument, or the like. The instrument mentioned here is an instrument included in an instrument panel of a vehicle, e.g., a speed meter, a fuel gauge, or the like.

The image reception unit 18 receives the image Ga supplied from the image source 7, converts the image Ga into a form suitable for display at the image display unit 2, and outputs the image Gb obtained by the conversion.

The image display unit 2 displays the image Gb outputted from the image reception unit 18, on the display panel 21. Also, the image display unit 2 controls the luminance of the backlight 22 based on the luminance control signal BA outputted from the luminance control unit 15. As a result, the visibility of the displayed image can be improved in accordance with both of the glare due to the image display unit 2 and the glare due to the external light, for the driver.

Like the display control device 5 in FIG. 1, part or the entirety of the display control device 5c in FIG. 14 can be formed of processing circuitry. The processing circuitry may be formed of a computer similar to that shown in FIG. 9.

A procedure of processes followed by the processor 91 in a case in which the above-mentioned display control device 5c is formed of a computer similar to that described above will now be explained with reference to FIG. 15.

The procedure of processes shown in FIG. 15 is generally identical to the procedure of processes shown in FIG. 10.

However, step ST1 in FIG. 10 is not provided, but step ST21 is provided.

In step ST21, reception and conversion of the image Ga, and output of the converted image Gb is performed. This process is similar to the process performed by the image reception unit 18 in FIG. 14.

According to Embodiment 3, even when an image other than the environment image is displayed by the image display unit 2, effects similar to those in Embodiment 1 can be obtained.

Embodiment 4

In Embodiments 1 to 3, the image display unit 2 shown in FIG. 2 is used. As an alternative, an image display unit 2b shown in FIG. 16 may be used.

The image display unit 2b shown in FIG. 16 includes a self-luminous display panel 23 and a gain multiplication unit 24. The self-luminous display panel 23 is for example formed of an organic EL (Electro Luminescence) panel.

The gain multiplication unit 24 determines a gain based on the luminance control signal BA, and multiplies the image data representing the image Eb or Gb by the determined gain. When the luminance level is to be raised, a larger gain is used. When the luminance level is to be lowered, a smaller gain is used.

The self-luminous display panel 23 performs display of an image based on the image data obtained as a result of the multiplication at the gain multiplication unit 24.

In this way, the image display unit 2b controls the luminance level of the displayed image by determining the gain based on the luminance control signal BA.

Even according to Embodiment 4, effects similar to those of Embodiments 1 to 3 can be obtained.

Embodiment 5

It is possible to apply the following variations to the set of rules for the adjustment of the luminance level at the luminance control unit 15 or 15b.

For example, in place of the set of rules explained with reference to FIG. 5, a set of rules shown in FIG. 17 may be used.

The set of rules shown in FIG. 17 is generally identical to the set of rules shown in FIG. 5.

However, in place of the above-mentioned rules (a11) to (a13), the following rule (a1) is used.

(a1) When the glare level at the time of viewing the outside of the image display unit 2 is "high", the luminance level of the displayed image is caused to be the highest without regard to the glare level at the time of viewing the image display unit 2.

In a case where the image display unit 2 provided with a backlight is used as in Embodiments 1 to 3, the process of causing the luminance level of the displayed image to be the highest is realized by setting the light emission brightness of the backlight 22 to be at the maximum.

When the rule (a1) is applied to Embodiment 2, however, the above-mentioned "maximum" means the upper limit value CU. This is because clipping is performed.

In a case where the image display unit 2b provided with the gain multiplication unit 24 is used as in Embodiment 4, the process of causing the luminance level of the displayed image to be the highest is realized by making the maximum gradation value of the image data obtained as a result of the multiplication at the gain multiplication unit 24 equal to the maximum value within the range of values which can be accepted by the display panel.

However, when the rule (a1) is applied to a configuration which is obtained by applying the variation of Embodiment 4 to Embodiment 2, the above-mentioned "maximum value" means the upper limit value CU. This is because clipping is performed.

According to Embodiment 5, because of the above-mentioned rule (a1), when the glare level at the time of viewing the outside of the image display unit 2 is "high", the luminance level of the image display unit is made to be the highest without regard to the glare level at the time of viewing the image display unit 2, so that the visibility of the displayed image can be improved even when the driver feels glare by the external light.

Embodiment 6

In place of the set of rules explained with reference to FIG. 5, a set of rules shown in FIG. 18 may be used.

The set of rules shown in FIG. 18 is generally identical to the set of rules shown in FIG. 5.

However, in place of the above-mentioned rule (a11), the following rule (a11b) is used.

(a11b) If the glare level at the time of viewing the outside of the image display unit 2 is "high", and the glare level at the time of viewing the image display unit 2 is "high", then the luminance level of the displayed image is lowered.

Embodiment 6 assumes a case in which the light which the driver receives from the image display unit is more intense than the light which the driver receives from the external light.

According to Embodiment 6, where an image display unit having a high luminance is used, because of the above-mentioned rule (a11b), when the glare level at the time of viewing the outside of the image display unit 2 is "high", and the glare level at the time of viewing the image display unit 2 is "high", then the luminance level of the displayed image is lowered, so that the glare due to the image display unit 2 can be reduced, and the visibility of the displayed image can be improved.

VARIATIONS

Embodiments of the present invention have been described. However, the present invention is not limited to the embodiments described, but various modifications are possible.

For example, it was explained that with regard to Embodiment 1, in place of the glare detection unit 14 shown in FIG. 1, the glare detection unit 14b shown in FIG. 7 or the glare detection unit 14c shown in FIG. 8 may be used. This also applies to Embodiment 2 and Embodiment 3.

Also, Embodiment 3 was described as a variation to Embodiment 1. A similar variation can be applied to Embodiment 2.

So far, description has been made of cases in which the image display device is provided with a single image display unit. When two or more image display units are provided, two or more display control devices respectively corresponding to the image display units may be provided, and each display control device may perform control over the display on the corresponding image display unit. In such a case, at least part of the environment imaging unit 3, the driver imaging unit 4, the illuminance detection unit 6, and the image source 7 may be shared. Also, part of the two or more display control devices may be shared. For example, the driver image acquisition unit 12 and the glare detection unit 14, and part of the line-of-sight detection unit 13 which detects the line of sight may be shared. A single display control device comprising parts shared as explained above and parts provided for individual image display units may be formed.

So far, the image display device according to the present invention has been described. A display control device forming part of the image display device, an image display method implemented by the image display device, and a display control method implemented by the display control device also form part of the present invention. Also, a program for causing a computer to execute the processes in the above-described display control device or the display control method, and a recording medium, for example, a non-transitory recording medium, which is readable by a computer and in which such a program is recorded, also form part of the present invention.

REFERENCE SIGNS 2,2b: image display unit; 3: environment imaging unit; 4: driver imaging unit; 5,5b, 5c: display control device; 6: illuminance detection unit; 7: image source; 11: environment image acquisition unit; 12: driver image acquisition unit; 13: line-of-sight detection unit; 14, 14b,14c: glare detection unit; 15,15b: luminance control unit; 16: illuminance acquisition unit; 17: limit value determining unit; 18: image reception unit; 21: display panel; 22: backlight, 23: self-luminous display panel; 24: gain multiplication unit; 41: pupil diameter information acquisition unit; 42: mimetic muscle information acquisition unit; 43,43b,43c: glare calculation unit.

The invention claimed is:

1. An image display device including:
   an image display mounted in a vehicle to display an image;
   a driver imaging unit including a camera and configured to capture an image of a driver of said vehicle; and
   a display control device including processing circuitry and configured to acquire an image of said driver from the image obtained by image-capturing by said driver imaging unit,
   to detect a line of sight of said driver based on the image of said driver,
   to judge whether said driver is viewing said image display or an outside of said image display based on the detected line of sight and information indicating a position of said image display,
   to detect glare being felt by said driver based on the image of said driver, and
   to determine a luminance level of the image displayed by said image display based on the glare at a time of viewing said image display and the glare at a time of viewing the outside of said image display; wherein
   said image display displays the image with the luminance level determined by said display control device.

2. The image display device as set forth in claim 1, wherein
   said display control device causes the luminance level of said displayed image to be higher when the glare at the time of viewing said image display is large, and the glare at the time of viewing the outside of said image display is large.

3. The image display device as set forth in claim 1, wherein
   said display control device causes the luminance level of said displayed image to be the highest when the glare at the time when the driver is viewing the outside of said image display is large.

4. The image display device as set forth in claim 1, wherein
   said display control device
   determines an upper limit value and a lower limit value for the luminance of said displayed image, based on an illuminance in said vehicle, and performs such a control that the luminance level of said displayed image does not become larger than said upper limit and does not become smaller than said lower limit.

5. The image display device as set forth in claim 1, wherein
   said display control device performs at least one of measurement of a pupil diameter and detection of a feature quantity of mimetic muscles, based on the image of said driver, and detects said glare based on a result of at least one of said measurement and said detection.

6. The image display device as set forth in claim 1, wherein
   said display control device acquires an environment image representing a state of an environment of said vehicle, and said image display displays the environment image acquired by said display control device.

7. The image display device as set forth in claim 1, wherein
said display control device acquires an image from an image source, and
said image display displays the image acquired by said display control device.

8. The image display device as set forth in claim 1, wherein
said image display includes a transmissive display panel and a backlight provided on a rear side of said display panel, and adjusts light emission brightness of said backlight based on the luminance level determined by said display control device.

9. The image display device as set forth in claim 1, wherein
said image display includes
a gain multiplication unit to multiply image data representing the image inputted to said image display by a gain, and
a display panel performing display based on the image data having been multiplied by said gain by said gain multiplication unit,
wherein the gain of said gain multiplication unit is determined based on the luminance level determined by said display control device.

10. A display control device to adjust luminance of an image displayed by an image display mounted in a vehicle to display the image, comprising:
processing circuitry
to detect a line of sight of a driver based on an image of said driver obtained by image-capturing, and to judge whether said driver is viewing said image display or an outside of said image display based on the detected line of sight and information indicating a position of said image display;
to detect glare being felt by said driver based on the image of said driver; and
to determine a luminance level of the image displayed by said image display based on the glare at a time of viewing said image display and the glare at a time of viewing the outside of said image display, wherein
said image display is caused to display the image with the luminance level determined by said processing circuitry.

11. A display control method for adjusting luminance of an image displayed by an image display mounted in a vehicle to display the image; comprising:
detecting a line of sight of a driver based on an image of said driver obtained by image-capturing;
judging whether said driver is viewing said image display or an outside of said image display based on the detected line of sight and information indicating a position of said image display;
detecting glare being felt by said driver based on the image of said driver;
determining a luminance level of the image displayed by said image display based on the glare at a time of viewing said image display and the glare at a time of viewing the outside of said image display; and
causing said image display to display the image with the luminance level having been thus determined.

12. A non-transitory recording medium in which a program for causing a computer to execute processes in the display control method as set forth in claim 11 is recorded, and which is readable by a computer.

13. An image display device including:
an image display mounted in a vehicle to display an image;
a driver imaging unit including a camera and configured to capture an image of a driver of said vehicle; and
a display control device including processing circuitry and configured to determine a luminance level of the image displayed by said image display, based on
information indicating whether said driver is viewing said image display or an outside of said image display, determined using information on a line of sight of said driver detected based on the image of said driver obtained by said driver imaging unit, and
information indicating glare being felt by said driver detected based on a measurement of a feature quantity of mimetic muscles in the image of said driver; wherein
said image display displays the image with the luminance level determined by said display control device.

14. The image display device as set forth in claim 13, wherein
said display control device causes the luminance level of said displayed image to be higher when the glare at the time of viewing said image display is large, and the glare at the time of viewing the outside of said image display is large.

15. The image display device as set forth in claim 13, wherein
said display control device causes the luminance level of said displayed image to be the highest when the glare at the time when the driver is viewing the outside of said image display is large.

16. The image display device as set forth in claim 13, wherein
said display control device
determines an upper limit value and a lower limit value for the luminance of said displayed image, based on an illuminance in said vehicle, and performs such a control that the luminance level of said displayed image does not become larger than said upper limit and does not become smaller than said lower limit.

17. The image display device as set forth in claim 13, wherein
said display control device performs measurement of a pupil diameter based on the image of said driver, and detects said glare based on a result of said measurement and said detection.

18. The image display device as set forth in claim 13, wherein
said display control device acquires an environment image representing a state of an environment of said vehicle, and
said image display displays the environment image acquired by said display control device.

19. The image display device as set forth in claim 13, wherein
said display control device acquires an image from an image source, and
said image display displays the image acquired by said display control device.

20. The image display device as set forth in claim 13, wherein
said image display includes a transmissive display panel and a backlight provided on a rear side of said display panel, and adjusts light emission brightness of said backlight based on the luminance level determined by said display control device.

\* \* \* \* \*